United States Patent [19]

Shames

[11] Patent Number: 5,515,972

[45] Date of Patent: May 14, 1996

[54] VIDEO INDEXING SYSTEM

[76] Inventor: Robert Shames, 20 Clent Rd., Apt. 2Z, Great Neck, N.Y. 11021

[21] Appl. No.: 507,151

[22] Filed: Jul. 26, 1995

[51] Int. Cl.$^6$ ........................................ B65D 5/16
[52] U.S. Cl. .................... 206/425; 206/232; 206/472; 206/387.1; 281/20; 283/43
[58] Field of Search .................. 206/425, 387.1, 206/387.13, 459.5, 472–473, 232; 281/20, 29; 283/43

[56] References Cited

U.S. PATENT DOCUMENTS

| | | | |
|---|---|---|---|
| 4,674,632 | 6/1987 | Friedman | 281/20 |
| 4,717,021 | 1/1988 | Ditzig | 206/472 |
| 4,757,901 | 7/1988 | Woods | 206/387.1 |
| 4,778,051 | 10/1988 | Schaub et al. | 206/387.1 |
| 4,789,058 | 12/1988 | Blaney | 206/232 |
| 4,932,520 | 6/1990 | Ciarcia et al. | 206/232 |
| 5,156,271 | 10/1992 | Toner | 206/472 |
| 5,170,889 | 12/1992 | Cue | 206/425 |
| 5,248,037 | 9/1993 | Kornberg et al. | 206/472 |

*Primary Examiner*—Paul T. Sewell
*Assistant Examiner*—Luan K. Bui
*Attorney, Agent, or Firm*—Collard & Roe

[57] ABSTRACT

A video indexing system for cataloging and organizing video cassettes. The indexing system utilizes a housing that is substantially identical to a video cassette container. A video directory having a plurality of erasable labels is releasable disposed in the housing. Each of the erasable labels has an index code corresponding to an adhesive label attached to the video cassette containers. An erasable marker is mounted within the video directory for writing therein. In addition, erasable labels are provided for the video cassettes themselves.

5 Claims, 3 Drawing Sheets

VIDEO INDEXING SYSTEM

BACKGROUND OF THE INVENTION

1. Field of the Invention

The invention relates to indexing systems. More particularly, it relates to a video indexing system having an erasable surface for receiving identification indicia with an erasable marker.

2. Prior Art

The patent to Blaney, U.S. Pat. No. 4,789,058 discloses an aesthetic displaying device for video tapes. The invention consists of a plain video cassette jacket having an area on the spine for receiving an assigned code. The code can consist of numbers, letters or other symbols. The device has an index booklet having the same shape and style as the video cassette jacket so the appearance is the same as the jacket holding the video cassette.

The patent to Sykes, U.S. Pat. No. 4,784,264 discloses a display album. The invention consists of a book like holder for video cassettes and their jackets. The book like holder has a clear spine, allowing the spine of the jacket to be clearly visible. In addition, the outside surface of the holder has a clear sleeve to receive printed insert sheets which may include additional information such as the title, date recorded, etc.

The patent to Ditzig, U.S. Pat. No. 4,717,021, discloses a video cassette container display. The invention consists of a video cassette jacket that folds around the tape and provides a plurality of transparent pockets on the outer surface for receiving and displaying labels, or other promotional information.

The Patent to Shyers, U.S. Pat. No. 4,341,307 discloses tape to change the aesthetic appearance of video cassette jackets into that of books. The invention consists of an adhesive strip designed like the binder of a book, and an adhesive strip designed like the page end of a book. Once these two strips are adhered to the jacket and put on the shelf, the jacket has the appearance of a book.

The patent to Kornberg, U.S. Pat. No. 5,248,037 discloses a display box simulating a book. The invention consists of a box that has exterior surfaces designed to simulate surfaces of a book.

The patent to Schaub U.S. Pat. No. 4,778,051 discloses a book like storage container for cassettes or the like. The storage container is formed from a single thermoplastic sheet of PVC plastic that has a pair of stackable trays formed on the inner face, and which are connected together by an integral spine in side by side relation.

The patent to Heyderman et al, U.S. Pat. No. 5,088,062 discloses a book like storage container including a receptacle for removably receiving a video cassette.

SUMMARY OF THE INVENTION

The invention comprises a housing having a front side, a back side, a top side, a bottom side, and a right and left side. The front side of the housing is open such that the housing forms a five sided rectangular box with an open sixth side (i.e., the front) to receive a video directory. The housing has the same dimensions of a standard video cassette container.

The video directory to be inserted into the housing is a sheet of cardboard or rigid paper having four panels. The first, third, and forth panels have erasable labels disposed on the inside surface thereof. The second panel is blank and is substantially the same size as the front open side of the rectangular housing. When the video directory is folded, the first panel folds along a longitudinal crease such that it forms a substantially perpendicular angle with the second panel. The second panel folds along a second longitudinal crease, parallel to the first longitudinal crease, to form a substantially perpendicular angle with the third panel. When the first and third panels are folded as described, said first and third sides are disposed substantially parallel to each other. The fourth panel is folded along a third longitudinal crease such the inside surface of the fourth and third panels are adjacent each other. When in its folded position, the video directory has a U-shaped cross section.

An erasable marking pen is detachably connected to the inside face of the second panel. When the video directory is inserted into the housing, the second panel substantially encloses the open front of said housing.

The device further includes labels that are attached to the video cassette containers. The labels have a letter coding system that corresponds to a letter within the video directory. Thus, the contents of a video cassette having a specific code letter is indicated on the erasable labels within the video directory.

The invention also includes labels that are directly attached to the video cassettes themselves. The labels have an erasable top surface for being marked with the marking pen of the video directory, and an adhesive bottom surface for attachment to the video cassettes.

It is therefore an object of the invention to provide a video indexing system that provides an organized method of identifying video cassettes.

Another object of the invention is to provide a video indexing system that identifies specific video cassettes by a code.

It is a further object of the invention to provide a video indexing system that is erasable and contains an erasable marker.

Yet another object of the invention is to provide a video indexing system that includes erasable labels for attaching to the video cassettes and marking with the erasable marker.

It is a further object of the invention to provide a video indexing system that operates reliably and efficiently.

BRIEF DESCRIPTION OF THE DRAWINGS

Other objects and features of the present invention will become apparent from the following detailed description considered in connection with the accompanying drawings, which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
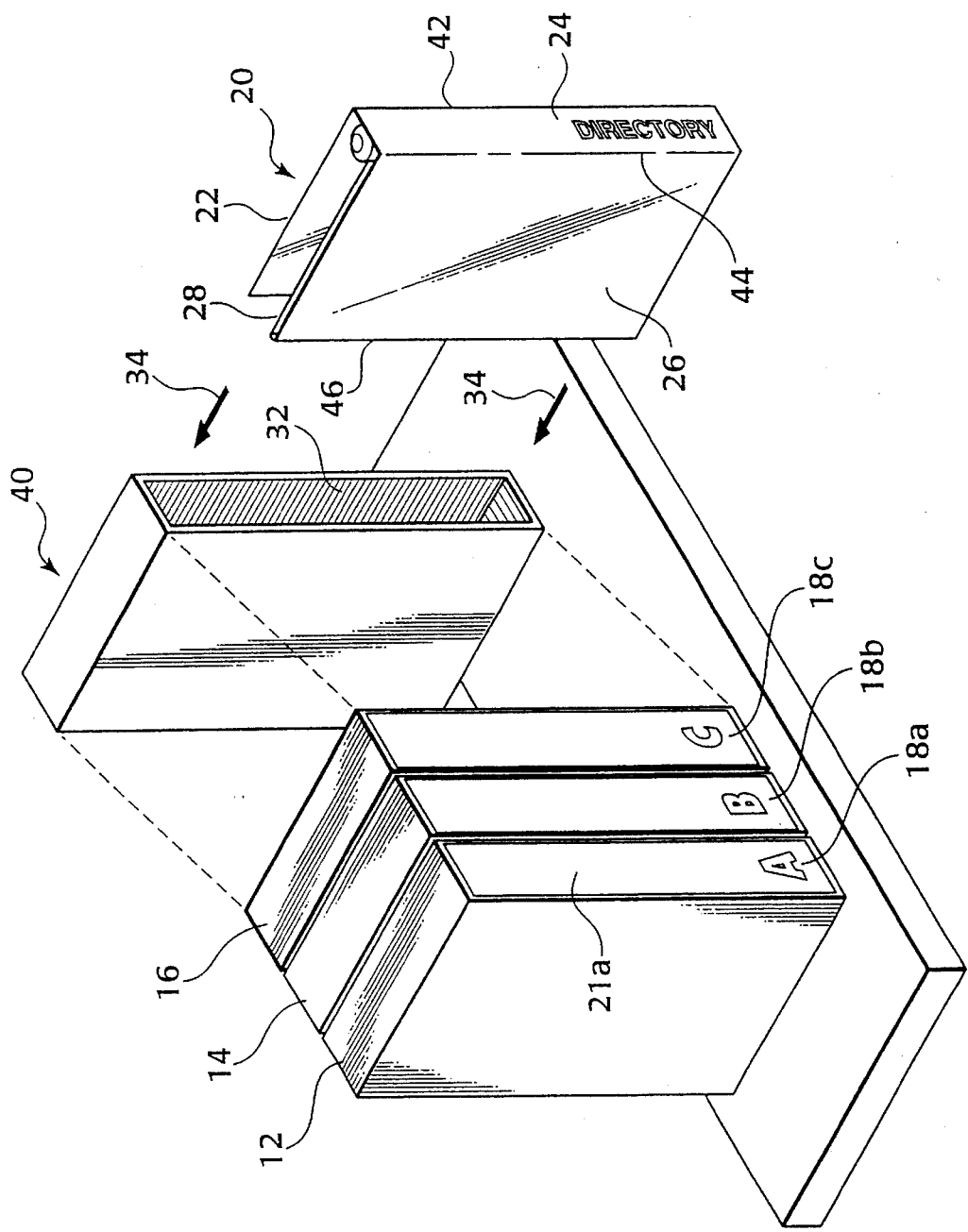
FIG. 1 is a perspective view of the video indexing system according to the invention.

Turning now in detail to the drawings, FIG. 1 shows the video directory 20 having four panels 22, 24, 26, and 28 in the folded position. As shown, fourth panel 28 is folded along crease 46 such that it overlies third panel 26. Thus, the inside surfaces of the fourth and third panels are disposed adjacent to each other when directory 20 is folded. Third panel 26 is folded along crease 44 such that it forms a substantially perpendicular angle with second panel 24. First panel 22 folds along crease 42 such that it too forms a substantially perpendicular angle with second panel 24.

Video directory 20 is inserted into the open face 32 of housing 40 as indicated by arrows 34. Housing 40 has the same dimensions as video cassette holders/containers 12, 14, and 16. Video cassette holders 12, 14, and 16, and thereby the video indexing system 20 can be designed in VHS, Beta or 8 mm format. Thus, when video directory 20 is within housing 40, the combination is such that it appears to be a video cassette when placed with the other video cassettes in the users video library.

The video cassette holders/containers 12, 14, and 16 are provided with labels 18a, 18b, and 18c, respectively. Labels 18a, 18b and 18c have a letter code 19 (FIG. 2b ) that corresponds to a letter code within video directory 20. Labels 18a–18c have an open area 21a above the letter code for receiving markings of a company or product name.

The second panel 24 of video directory 20 has an outer surface that has identification indicia indicating that it is a video directory. In addition, the outer surface of second panel 24 can include company or product name markings for retail purposes.

Figure 2:
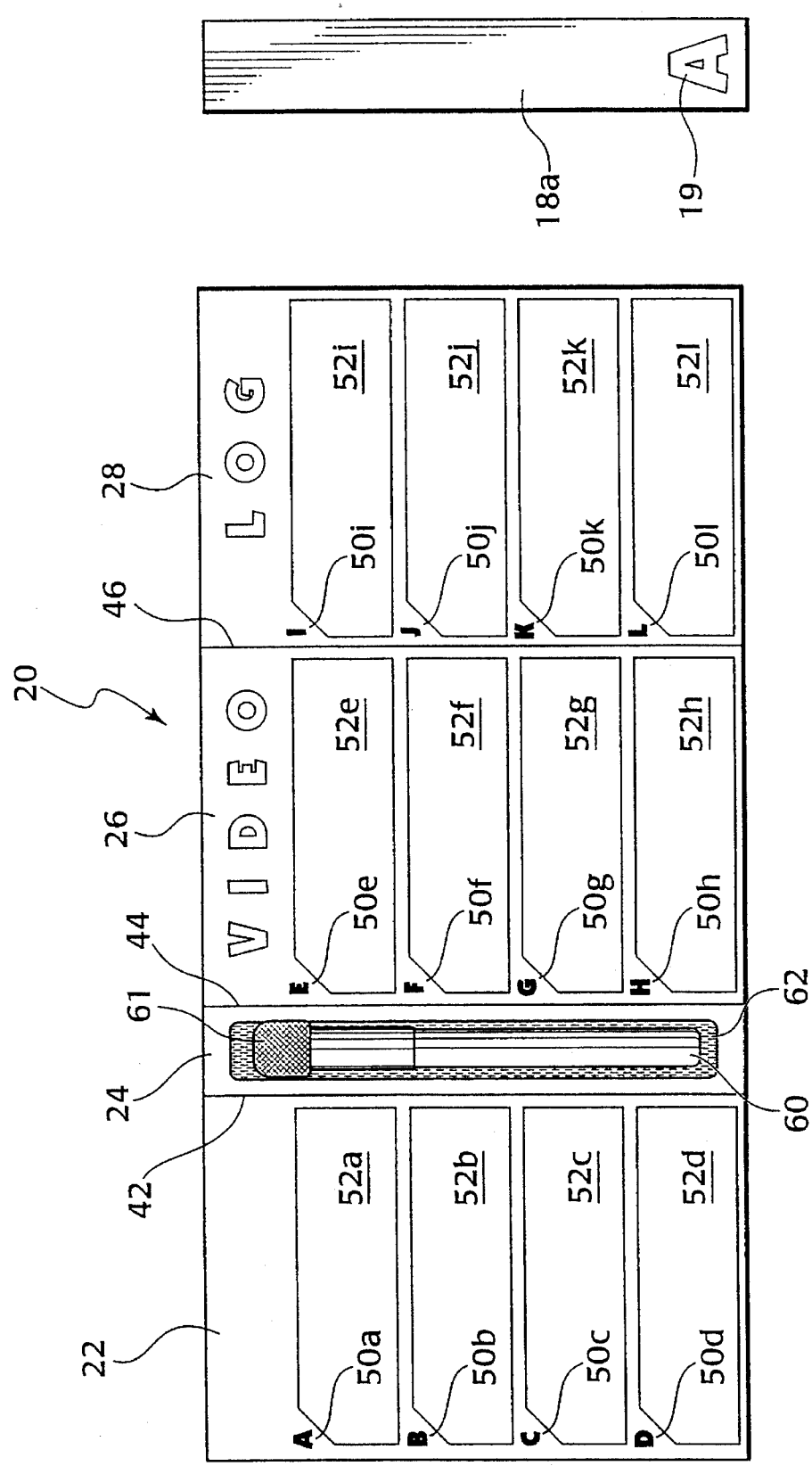
FIG. 2a is a front view of the video directory in an open position according to the invention.
FIG. 2b is a front view of an indexing label according to the invention.

FIG. 2a shows video directory 20 in its open position. Video directory 20 has erasable labels 52a –52l disposed on the first, third and fourth panels 22, 26, and 28, respectively. Each of the erasable labels 52a–52l have a corresponding letter code 50a–50l. FIG. 2b shows a label 18a for the video cassette holders. Label 18a has a letter code 19 that corresponds to the particular letter code 50a–50l within video directory 20. Therefore, when the user opens video directory 20 and identifies the letter code 50a–50l associated with the selection to be watched, they need only retrieve the video cassette having the label corresponding to that letter code.

Video directory 20 has an erasable marker 60 releasably attached to the inside surface of second panel 24. A hook and loop type fastener 62 (i.e., VELCRO), or any other suitable known type of releasable fastener, can be used to maintain marker 60 in its designated position. Labels 52a–52l are made of an erasable material such as, for example, erasable marker board. Thus, when the user records on the video cassette having label 18a having code 19 as represented by "A" erasable marker 60 is used to write the name of the selection in box 52a which has the corresponding letter code "A".

As time passes the user may find it necessary to record over a previously indexed selection. As such, the label 52a corresponding to the letter code on the video cassette, via label 18a, is erased, and the new selection name is written therein. Erasable marker 60 is provided with an eraser 61 to enable the erasure of the erasable labels 52a–52l.

Figure 3:
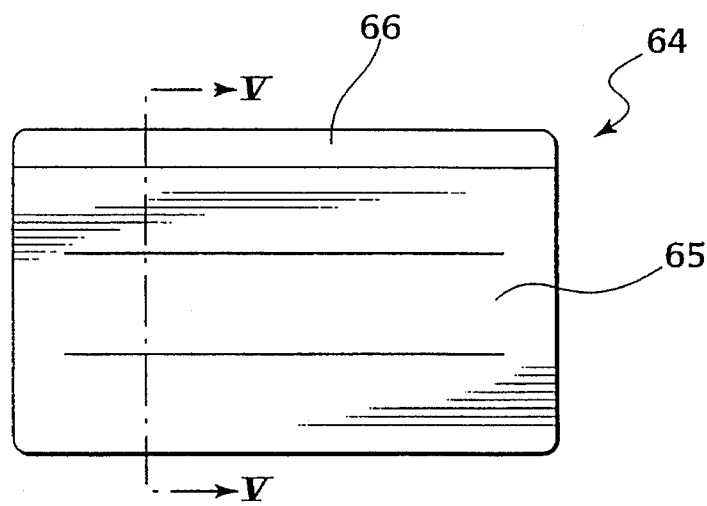
FIG. 3 is a top view of an erasable label according to the invention.

FIG. 3 shows an erasable label 64 according to the invention. Label 64 is to be applied directly to a video cassette, and has an erasable top surface 65 for receiving markings with the erasable marker 60. The erasable surface 65 can be erasable marker board or any other suitable known type of material. Label 64 is generally mounted on the top side of the video cassette, and includes a space 66 at the top thereof for permanently imprinting markings of a company or product name.

Figure 4:
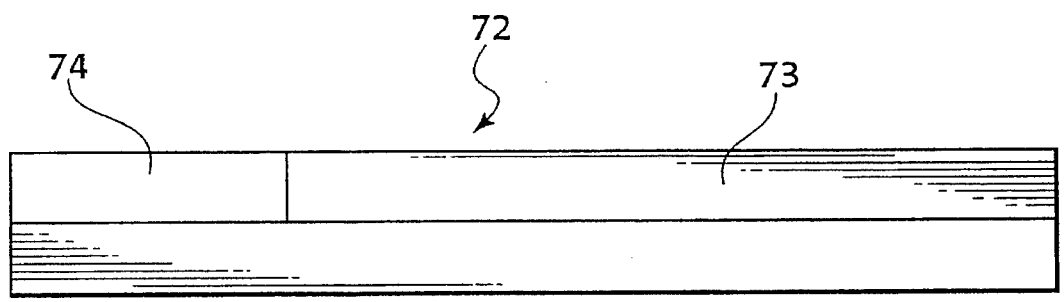
FIG. 4 is a top view of another embodiment of an erasable label according to the invention.

FIG. 4 shows an additional embodiment of an erasable label 72. Label 72 is also applied directly to a video cassette along the spine thereof. Label 72 has an erasable top surface 73 that can be written on with erasable marker 60. Label 72 includes a space 74 thereon for permanently imprinting markings of a company name or product name.

Figure 5:
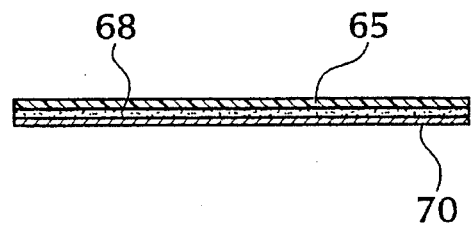
FIG. 5 is a cross-sectional view of the erasable label taken along line V—V of FIG. 3.

FIG. 5 shows a cross-section of label 64 of FIG. 3. Label 64 has a top surface 65 comprised of an erasable material such as, for example, a plastic based marker board or any other suitable known material that is easily erasable. An adhesive material 68 is disposed directly under top surface 65 such that label 64 can be mounted onto a video cassette as desired. Adhesive surface 68 is covered by a paper layer 70 before label 64 is adhered to the video cassette. Paper layer 70 is removed in order to apply label 64 to the video cassette.

To utilize this invention the user would remove video directory 20 from housing 40, look up the title on labels 52a–52l, determine which selection is to be viewed, then match the code of the title to be viewed with the corresponding letter code on the video cassette containers via labels 18.

While one embodiment of the present invention has been shown and described, it is to be understood that many changes and modifications may be made thereunto without departing from the spirit and scope of the invention as defined in the appended claims.

I claim:

1. A video indexing system for cataloging and organizing video cassettes having video containers comprising:

a housing having a front, a back, a top, a bottom, and two spaced parallel sides connected said back, top and bottom sides, said front being open such that said housing is substantially identical to the video container of the video cassettes;

a video directory having a first, a second, a third and a fourth panel, each of said panels having an inside surface and an outside surface, said video directory being folded such that the inside surface of said fourth panel is adjacent the inside surface of said third panel, and said first and third panel are folded to form substantially perpendicular angles with said second panel, said video directory being inserted into said housing when folded such that the outer surface of said second panel substantially closes said open front of said housing;

a plurality of erasable labels disposed on the inside surface of said first, third and fourth panels, each of said plurality of erasable labels having an index code;

a plurality of adhesive labels for mounting on the video containers of the video cassettes, each of said plurality of adhesive labels having an index code corresponding to the index code of said plurality of erasable labels; and an erasable marker releasably mounted to the inside surface of said second panel, said erasable marker for marking said erasable labels within said video directory and thereby indicating the contents of the video cassette having the adhesive label with the index code corresponding to the index code of the erasable label.

2. The video indexing system according to claim 1, wherein said plurality of erasable labels are formed of a plastic erasable surface.

3. The video indexing system according to claim 2, wherein said plastic erasable surface is an erasable marker board.

4. The video indexing system according to claim 1, wherein said erasable marker is releasably fastened to said inside surface of said second panel with a hook and loop type fastener.

5. The video indexing system according to claim 1, further comprising:
 a plurality of erasable adhesive labels for attaching to the video cassettes, said erasable adhesive labels being erasably marked with said erasable marker mounted within said video directory.

* * * * *